(12) United States Patent
Ibrahim

(10) Patent No.: US 7,751,973 B2
(45) Date of Patent: Jul. 6, 2010

(54) CURVE WARNING SYSTEM

(75) Inventor: Faroog Abdel-kareem Ibrahim, Dearborn Heights, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1828 days.

(21) Appl. No.: 10/838,598

(22) Filed: May 4, 2004

(65) Prior Publication Data

US 2005/0251335 A1    Nov. 10, 2005

(51) Int. Cl.
G01C 21/00    (2006.01)
(52) U.S. Cl. .......................... 701/213; 701/93; 701/96; 701/208; 701/218; 340/332; 340/905; 340/932; 340/933; 340/934; 455/450
(58) Field of Classification Search ................ 701/93, 701/96, 218, 213, 208; 340/905, 332, 932, 340/933, 934; 455/450
See application file for complete search history.

(56) References Cited

U.S. PATENT DOCUMENTS

| | | | | |
|---|---|---|---|---|
| 5,315,295 | A | * | 5/1994 | Fujii ........................... 340/936 |
| 5,485,381 | A | * | 1/1996 | Heintz et al. ................... 701/93 |
| 5,673,039 | A | * | 9/1997 | Pietzsch et al. ............. 340/905 |
| 5,748,476 | A | | 5/1998 | Sekine et al. |
| 5,790,403 | A | | 8/1998 | Nakayama |
| 5,854,987 | A | * | 12/1998 | Sekine et al. .................. 701/41 |
| 5,878,361 | A | * | 3/1999 | Sekine et al. .................. 701/41 |
| 5,878,362 | A | * | 3/1999 | Sekine et al. .................. 701/41 |
| 5,928,299 | A | * | 7/1999 | Sekine et al. .................. 701/41 |
| 5,934,407 | A | * | 8/1999 | Shimizu et al. ............. 180/446 |
| 6,005,492 | A | | 12/1999 | Tamura et al. |
| 6,014,608 | A | | 1/2000 | Seo |
| 6,092,005 | A | | 7/2000 | Okada |
| 6,092,014 | A | | 7/2000 | Okada |
| 6,125,324 | A | | 9/2000 | Matsuda et al. |
| 6,138,084 | A | | 10/2000 | Mine |
| 6,141,617 | A | | 10/2000 | Matsuda et al. |
| 6,169,952 | B1 | | 1/2001 | Matsuda et al. |

(Continued)

FOREIGN PATENT DOCUMENTS

EP    0 901 929 A1    3/1999

(Continued)

OTHER PUBLICATIONS

Hessburg et al., Fuzzy logic control for lateral vehicle guidance, 1994, IEEE, p. 55-63.*

(Continued)

*Primary Examiner*—Khoi Tran
*Assistant Examiner*—McDieunel Marc
(74) *Attorney, Agent, or Firm*—Brinks Hofer Gilson & Lione

(57) ABSTRACT

An in-vehicle system and method for warning a driver of upcoming curves in a road including. In general, a vehicle positioning module determines the vehicle's position in a global positioning system and a map matching module determines the vehicle's position on a map based on the position in the global positioning system. A look ahead module looks ahead on the map for a curve, determines a candidate list of probable driving paths through the curve, and from this candidate list determines the most likely path of the vehicle around the curve. A warning module then assesses the threat the upcoming curve poses to the vehicle.

14 Claims, 3 Drawing Sheets

U.S. PATENT DOCUMENTS

| | | |
|---|---|---|
| 6,185,496 B1 * | 2/2001 | Matsuno ................. 701/70 |
| 6,188,316 B1 * | 2/2001 | Matsuno et al. ........... 340/441 |
| 6,191,704 B1 | 2/2001 | Takenaga et al. |
| 6,199,011 B1 | 3/2001 | Matsuda |
| 6,268,825 B1 | 7/2001 | Okada |
| 6,285,923 B1 | 9/2001 | Matsuda et al. |
| 6,343,253 B1 | 1/2002 | Matsuura et al. |
| 6,392,535 B1 * | 5/2002 | Matsuno et al. ........... 340/441 |
| 6,424,904 B1 * | 7/2002 | Takahashi et al. ........... 701/70 |
| 6,442,453 B1 | 8/2002 | Fukuoka |
| 6,459,365 B2 | 10/2002 | Tamura |
| 6,633,811 B1 | 10/2003 | Aumayer |
| 7,474,961 B2 * | 1/2009 | Ibrahim ................. 701/209 |
| 2002/0161513 A1 | 10/2002 | Bechtolsheim et al. |
| 2002/0193944 A1 | 12/2002 | Stewenius |
| 2003/0065432 A1 | 4/2003 | Shuman et al. |
| 2005/0240334 A1 * | 10/2005 | Matsumoto et al. ........... 701/93 |
| 2007/0087756 A1 * | 4/2007 | Hoffberg ................. 455/450 |

FOREIGN PATENT DOCUMENTS

| | | |
|---|---|---|
| EP | 1 104 881 A1 | 6/2001 |
| GB | 2 283 353 A | 5/1995 |
| GB | 2 343 016 A | 4/2000 |
| JP | 11316899 | 11/1999 |

OTHER PUBLICATIONS

Fenton et al., On the optimal design of an automotive lateral controller, 1988, IEEE, p. 108-113.*

Goto et al., The CMU system for mobile robot navigation, 1987, IEEE, p. 99-105.*

* cited by examiner

CURVE WARNING SYSTEM

BACKGROUND

The present invention generally relates to vehicle navigation systems. More specifically, the invention relates to a navigation system for vehicles maneuvering through curves.

Increasingly, navigation systems have been installed in vehicles that provide guidance to the driver of the vehicle. Based on a map database and GPS, the navigation system informs the driver about the position of the vehicle on a particular route. Because the map database includes the road shape of the route, the system can inform the driver of upcoming curves along the roadway and provide warnings about the curves. However, the aforementioned systems do not provide any real threat assessment of the upcoming curves. That is, the systems may estimate the curvature of the roads but do not warn the driver of the potential threat of the curves in the roads.

SUMMARY

In overcoming the above mentioned drawbacks and other limitations of the related art, the present invention provides a system and method for warning a driver of upcoming curves in a road including. In general, a vehicle positioning module determines the vehicle's position in a global positioning system and a map matching module determines the vehicle's position on a map based on the position in the global positioning system. A look ahead module looks ahead on the map for a curve, determines a candidate list of probable driving paths through the curve, and from this candidate list determines the most likely path of the vehicle around the curve. A warning module then assesses the threat the upcoming curve poses to the vehicle.

Further features and advantages of this invention will become readily apparent from the following description and from the claims.

DETAILED DESCRIPTION

Figure 1:
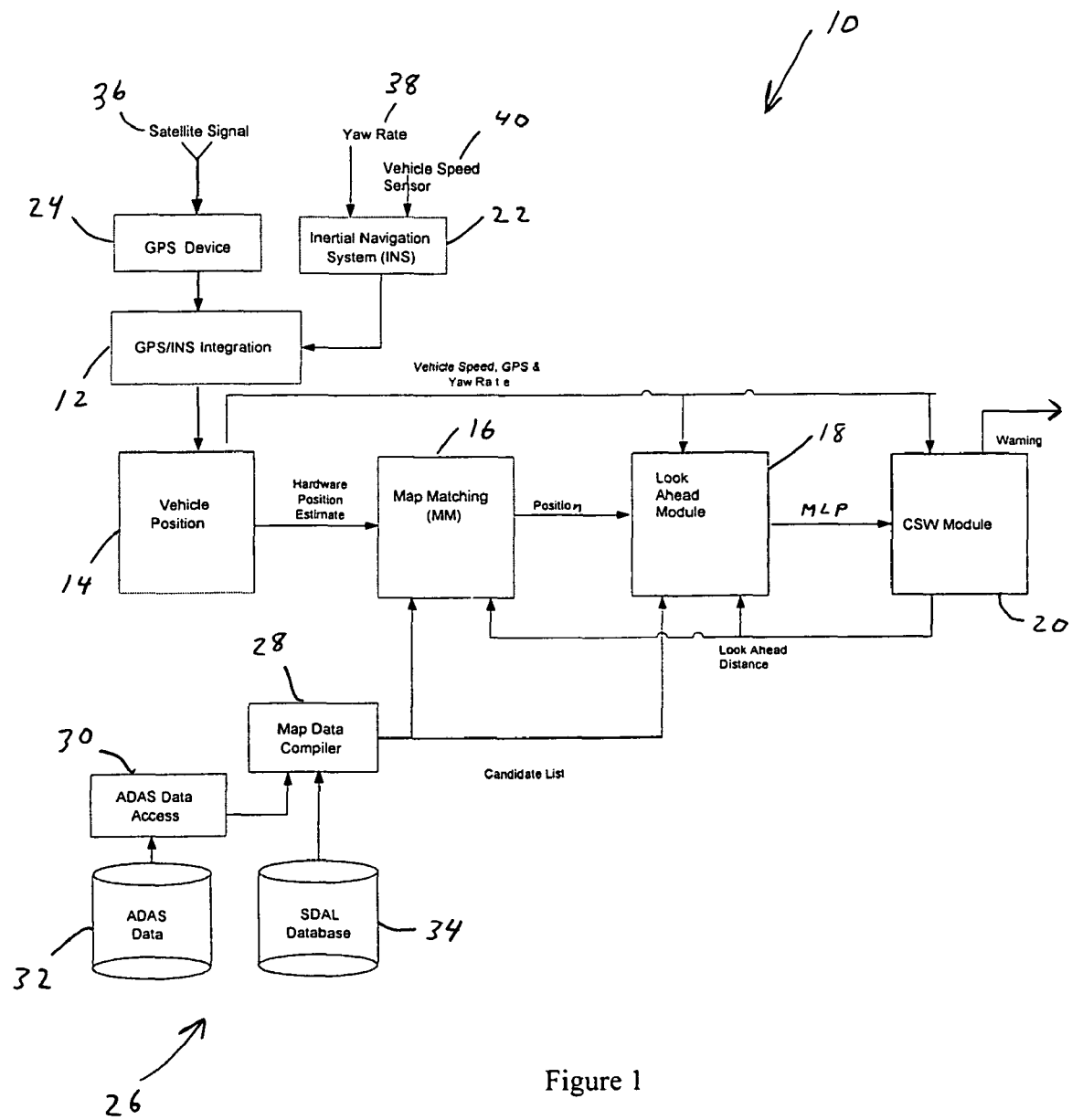
FIG. 1 is a block diagram of a system for warning a vehicle about its curve speed in accordance with the invention.

Referring now to the drawings, a system embodying the principles of the present invention is illustrated therein and designated at 10. As its primary components, the system 10 includes a global positioning system (GPS) and inertial navigation system (INS) integration module 12, a vehicle positioning module 14, a map matching module 16, a look ahead module 18, and a curve speed warning module 20. The system 10 is also provided with an inertial navigation system 22, a GPS receiver 24, a map database 26, and yaw rate and vehicle speed sensors. The map database 26 includes a map data compiler 28 and an ADAS data access 30 that receives information from an ADAS data base 32. The map data complier 28 also receives information from an SDAL database 34. The map database may be a database that is commercially available.

The GPS receiver 24 receives satellite information 36 related to the vehicle GPS position. In the GPS/INS integration module 12, the GPS position is augmented using, for example, a Kalman filter, with the yaw rate 38 and the vehicle speed 40 obtained through the inertial navigation system 22. The information from the GPS/INS integration module 12 is provided to the vehicle positioning module 14, where the vehicle position is calculated in a global coordinate system.

The map matching module 16, implemented with a map matching algorithm, receives the hardware position estimate from the vehicle positioning module 14 and information from the map database 26 to calculate the vehicle position on the map. The look ahead module 18 then receives the map position information from the map matching module 16, as well as information from the vehicle positioning module 14 and the map database 26, and looks ahead in the map from the calculated map position and calculates the candidate list of probable intended driving paths, in particular, a most likely path (MLP) based on probabilities.

Once the most likely path is determined, a curvature calculation algorithm residing, for example, in the look ahead module 18, is applied to the most likely path to determine the curvature values which, along with the vehicle speed from the vehicle positioning module 14, are passed to the curve speed warning module 20. A threat assessment algorithm implemented in the curve speed warning module 20 assesses the threat to the vehicle and makes a warning decision 44.

Figure 2:
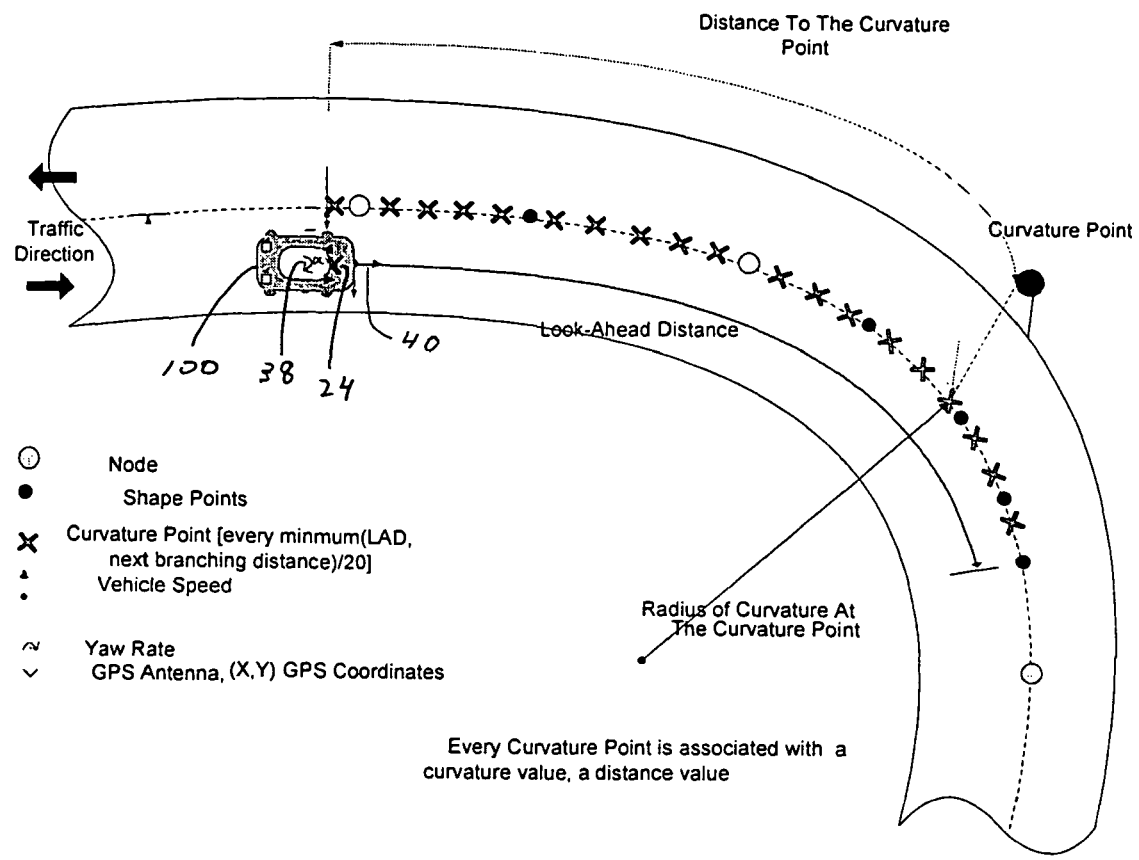
FIG. 2 is a schematic of a vehicle approaching a curve.
Figure 3:
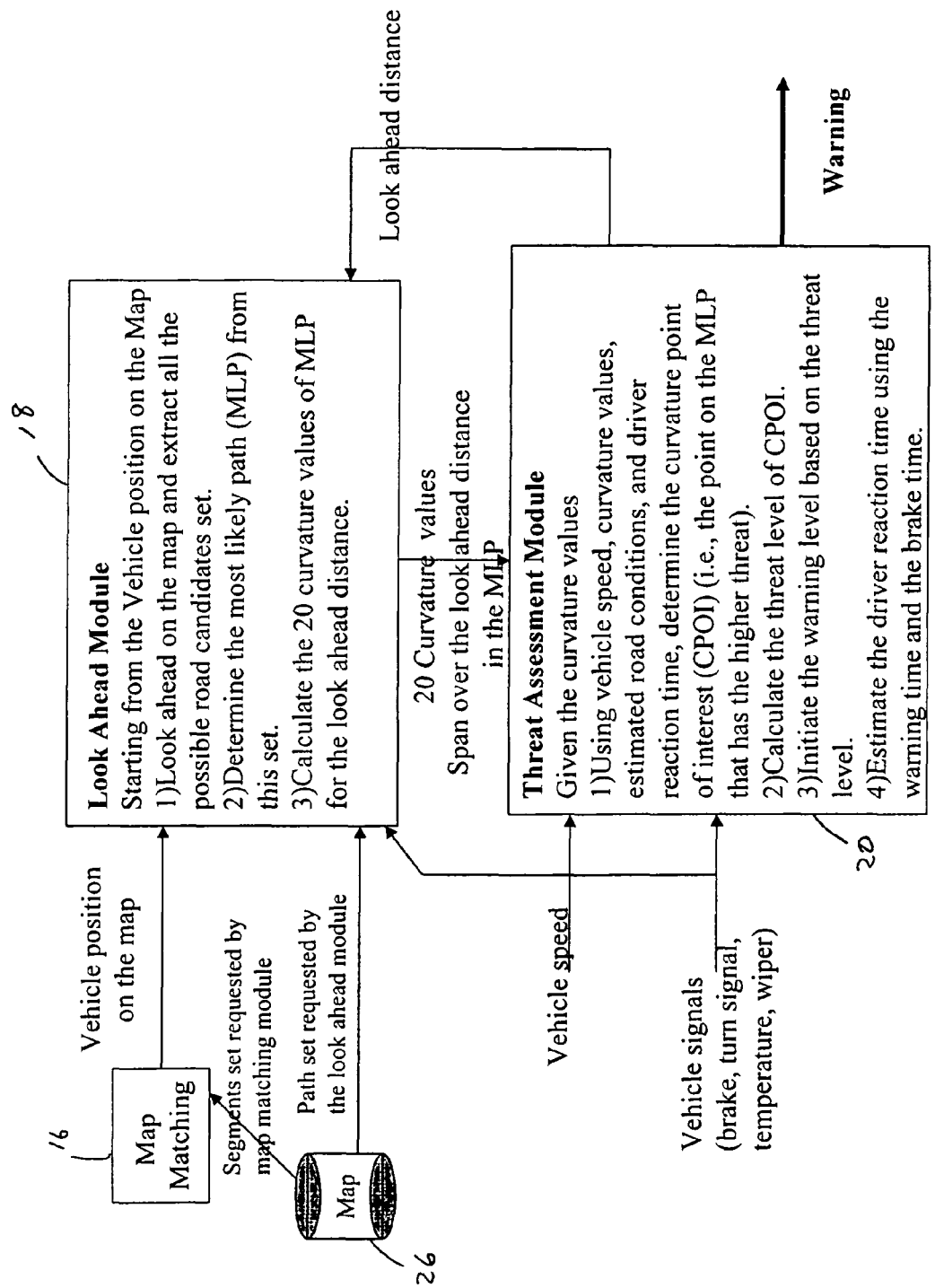
FIG. 3 is a flow diagram of the algorithm implemented in the system of FIG. 1 in accordance with the invention.

A specific example of the implementation of the system 10 implemented in a vehicle 100 is shown in FIGS. 2 and 3. The vehicle 100 includes a GPS antenna 24 to determine the GPS coordinates (X,Y), a yaw rate sensor to determine the vehicle yaw rate 38, and a speed sensor to determine the vehicle speed 40. The map database 26 provides map segments to the matching module 16 and path set information to the look ahead module 18. The look ahead module 18 predicts the intended driving path based on the information received from the map matching module 16 and directly from the map database 26. For example, it the vehicle is approaching a road branch (exit ramp, fork, etc.), the look ahead module 18 determines the most likely path with an assigned confidence level. The look ahead module 18 also calculates the optimal curvature from the shape points using a Kalman filter and a road model which enables calculating curvature values at each shape point and between the shape points. Further, each point is assigned a curvature and a travel distance so that the look ahead module 18 calculates a look ahead distance, for example, to twenty curvature points.

The threat assessment algorithm in the curve speed warning module 20 evaluates the curvature values from the look ahead module 18 to evaluate the potential threat of each of the twenty points to determine which of the points has the highest threat, which is referred to as a curvature point of interest (CPOI). Specifically, the threat assessment algorithm determines the curvature point of interest (CPOI) based on a cost function that takes into consideration the vehicle speed, the estimated projected speed profile, the travel distance to the curvature point, the curvature of the curvature point, the estimated road conditions, and the driver reaction time. The estimated road conditions may be calculated from the vehicle's signals, such as brake signals, turn signals, ambient temperature, and wiper functions. In certain implementations, the curvature point of interest is calculated about every 200 msec. The curve speed warning system 20 then initiates a warning level based on the calculated threat level.

Note that the driver reaction time is estimated adaptively inside the system 10; that is, the system 10 estimates the driver reaction time from the driver behavior after a warning is initiated. The look ahead distance is calculated from the current vehicle speed, the estimated projected speed profile, the adaptive driver reaction time, the road conditions, and the branching conditions of the road geometry. The look ahead distance calculated in the threat assessment algorithm is also fed back to the look ahead module 18. The system 10 compensates for the inherent latency in a navigation system by employing a push ahead algorithm for the vehicle position.

In sum, when a vehicle exceeds the defined limit for approaching a given curve in a road, the vehicle may not be able to neogiate the curve safely. In accordance with the invention, the system 10 warns the driven when the vehicle is approaching an upcoming curve too fast. The system 10 uses a land navigation system to perform vehicle positioning including, for example the GPS receiver 24, the speed sensor 40, the yaw rate sensor 38, and the map database 26. The GPS position is augmented with the yaw rate 38 and speed measurement 40 to calculate the vehicle position in a global coordinate system. Using the map database, the map-matching algorithm puts this calculated position on the map. The curve speed warning module looks ahead in the map from this calculated position and calculates the candidate list of probable intended driving paths. Once the most likely path is determined, a curvature algorithm is applied to this MLP. The resultant curvature values along with the vehicle speed are used to assess the threat and make a warning decision.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

What is claimed is:

1. An in-vehicle system for warning a driver of a vehicle moving at an excess speed, the in-vehicle system comprising:
    a vehicle positioning module which determines the vehicle's position in a global coordinate system;
    a map matching module which determines the vehicle's position on a map based on the position in the global coordinate system and a map database;
    a look ahead module which determines a candidate list of probable driving paths through the curve by the vehicle based on the map database, from this candidate list determines a most likely path of the vehicle around the curve, and which applies a curvature calculation to the most likely path of the vehicle; and
    a warning module which assesses the threat posed to the vehicle based on the most likely path of the vehicle, the curvature calculation, and the excess speed, the warning module calculating curvature points along the most likely path, threat levels for each of the curvature points, and determining a curvature point of interest being that curvature point with the highest threat level, and wherein the warning module initiates a warning level based on the threat level of the curvature point of interest.

2. The in-vehicle system of claim 1 further comprising an integration module which receives satellite signals through a global positioning device and augments the satellite signals with signals from an inertial navigation system regarding vehicle behavior and provides the augmented signals to the vehicle positioning module.

3. The in-vehicle system of claim 2 wherein the vehicle behavior includes the vehicle yaw rate and the vehicle speed.

4. The in-vehicle system of claim 1 wherein the look ahead module calculates a look ahead distance.

5. The in-vehicle system of claim 1 wherein the curvature point of interest is based on the curvature values of the road.

6. The in-vehicle system of claim 1 wherein the curvature point of interest is based on the estimated road conditions.

7. The in-vehicle system of claim 6 wherein the estimated road conditions are based on operating signals from the vehicle.

8. The in-vehicle system of claim 1 wherein the curvature point of interest is based on the driver's reaction time.

9. A system for warning a driver of a vehicle traveling at an excess speed, the system comprising:
    a vehicle positioning module which determines the vehicle's position in a global positioning system;
    a map matching module which determines the vehicle's position on a map based on the position in the global positioning system;
    a look ahead module which determines a candidate list of probable driving paths, and from this candidate list determines the most likely path of the vehicle and which applies a curvature calculation to the most likely path of the vehicle; and
    a warning module which assesses the threat posed to the vehicle based on the most likely path of the vehicle, the curvature calculation and the excessive speed, wherein the warning module calculates a curvature point of interest on the most likely path, and wherein the curvature point of interest is based on the driver's reaction time, and the driver's reaction time is based on the driver's time of response to apply the brakes based on a previous warning.

10. A method for warning a driver of a vehicle approaching a curve at an excess speed, the method comprising:
    determining the vehicle's position in a global positioning system;
    determining the vehicle's position on a map based on the position in the global positioning system and a map database;
    determining a candidate list of probable driving paths through the curve for the vehicle based on the map database, and from this candidate list determining the most likely path of the vehicle around the curve; and
    assessing the threat posed to the vehicle based on the most likely path of the vehicle, the assessing step including calculating curvature points for the most likely path and determining threat levels for each of the curvature points, identifying a curvature point of interest on the most likely path, the curvature point of interest being the curvature point with the highest threat level;
    initiating a warning level based on the curvature point of interest;
    wherein the preceding steps are performed within the vehicle.

11. The method of claim 10 wherein determining the vehicle's position in a global positioning system includes receiving satellite signals through a global positioning device and augmenting the satellite signals with signals from an inertial navigation system regarding vehicle behavior.

12. The method of claim 11 wherein the vehicle behavior includes the vehicle yaw rate and the vehicle speed.

13. The method of claim 10 further comprising calculating the curvature of the most likely path.

14. The method of claim 13 further comprising calculating a look ahead distance, and utilizing the curvature and the look ahead distance in assessing the threat.

* * * * *